United States Patent [19]

Harrington et al.

[11] Patent Number: 5,440,616
[45] Date of Patent: Aug. 8, 1995

[54] METHOD AND APPARATUS FOR INTERCONNECTING A MESSAGING SYSTEM AND A PRIVATE BRANCH EXCHANGE

[75] Inventors: Daniel A. Harrington, Menlo Park; Maura E. Higgins, Mountain View; Ivan M. Lee, Fremont, all of Calif.; Joseph D. Remson, Phoenix, Ariz.; Kenneth E. Waln, San Jose, Calif.

[73] Assignee: Rolm Company, Santa Clara, Calif.

[21] Appl. No.: 194,238

[22] Filed: Feb. 10, 1994

[51] Int. Cl.⁶ .................... H04M 1/64; H04Q 11/00
[52] U.S. Cl. ........................................ 379/88; 379/67; 370/61; 370/95.1
[58] Field of Search ............... 379/67, 88, 89, 228, 379/221, 229, 230; 370/80, 61, 95.1, 95.3; 375/38; 455/34.1, 34.02

[56] References Cited

U.S. PATENT DOCUMENTS

| | | | |
|---|---|---|---|
| 4,829,514 | 5/1989 | Frimmel, Jr. et al. | 370/61 |
| 4,870,408 | 9/1989 | Zdunek et al. | 455/34.1 |
| 4,873,718 | 10/1989 | Barnett et al. | 379/156 |
| 4,926,462 | 5/1990 | Ladd et al. | 379/198 X |
| 5,046,181 | 9/1991 | Higuchi et al. | 379/229 X |
| 5,155,760 | 10/1992 | Johnson et al. | 379/410 |
| 5,222,124 | 6/1993 | Castaneda et al. | 379/89 X |
| 5,274,838 | 12/1993 | Childress et al. | 379/58 X |
| 5,301,226 | 4/1994 | Olson et al. | 379/232 |
| 5,333,187 | 7/1994 | Hiraiwa et al. | 379/230 |

Primary Examiner—James L. Dwyer
Assistant Examiner—Daniel S. Hunter
Attorney, Agent, or Firm—Michael B. Einschlag

[57] ABSTRACT

Interconnecting a messaging system (voice, facsimile, and so forth) with a PBX which provides entirely digital voice transmission and which provides high bandwidth and redundant transmission of control information between the messaging system and the PBX. The telephone system includes: (a) a telephone switching system including an interface to one or more digital links, the interface for supplying control and voice information relating to a call over one of the digital links and for receiving other control and voice information relating to the call or to another call over the digital link, the other control and voice information relating to another call including information relating to In-Band Message Notification (IBMN); (b) a messaging system for receiving a portion of the control information and a portion of the voice information relating to the call from the telephone system and for transmitting the other control and voice information to the telephone system; and (c) a messaging system interface between the digital links and the messaging system, the messaging system interface for receiving the control and voice information from the digital link and for supplying the portion of the control information and the voice information from the call to the messaging system and for transmitting the other control and voice information received from the messaging system over the digital link.

6 Claims, 4 Drawing Sheets

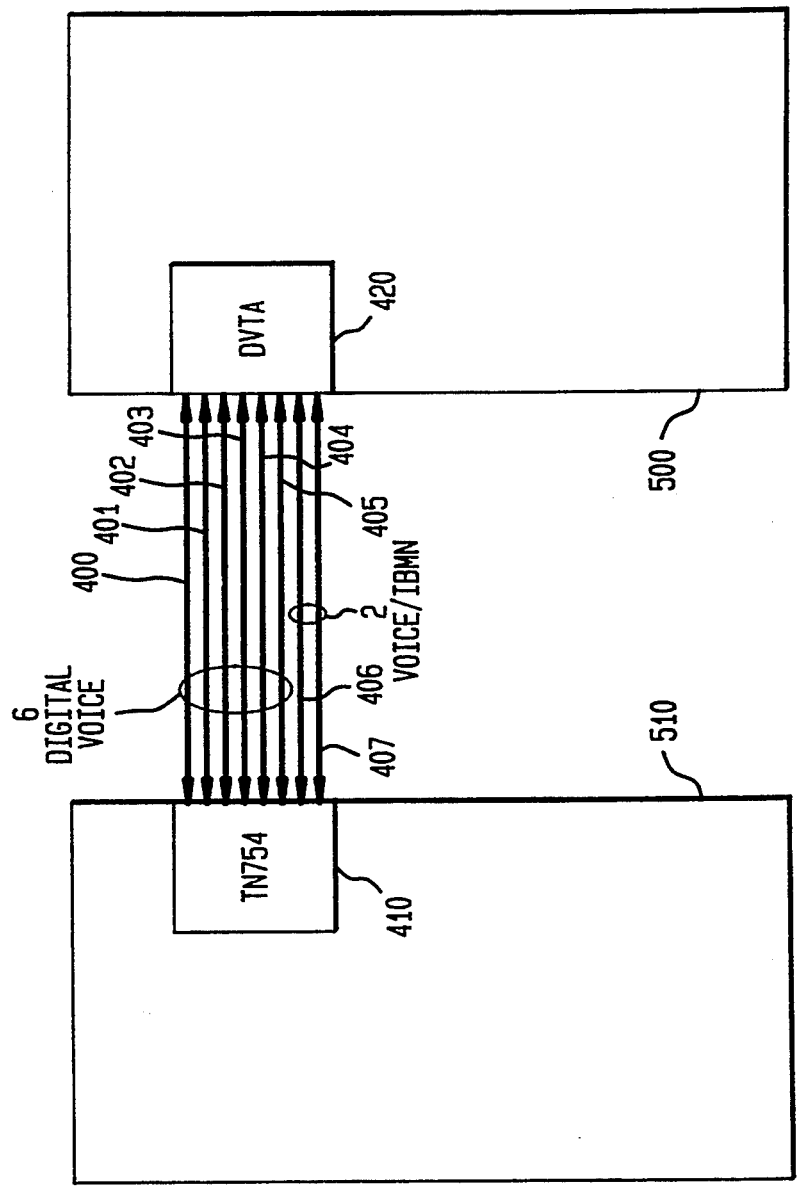

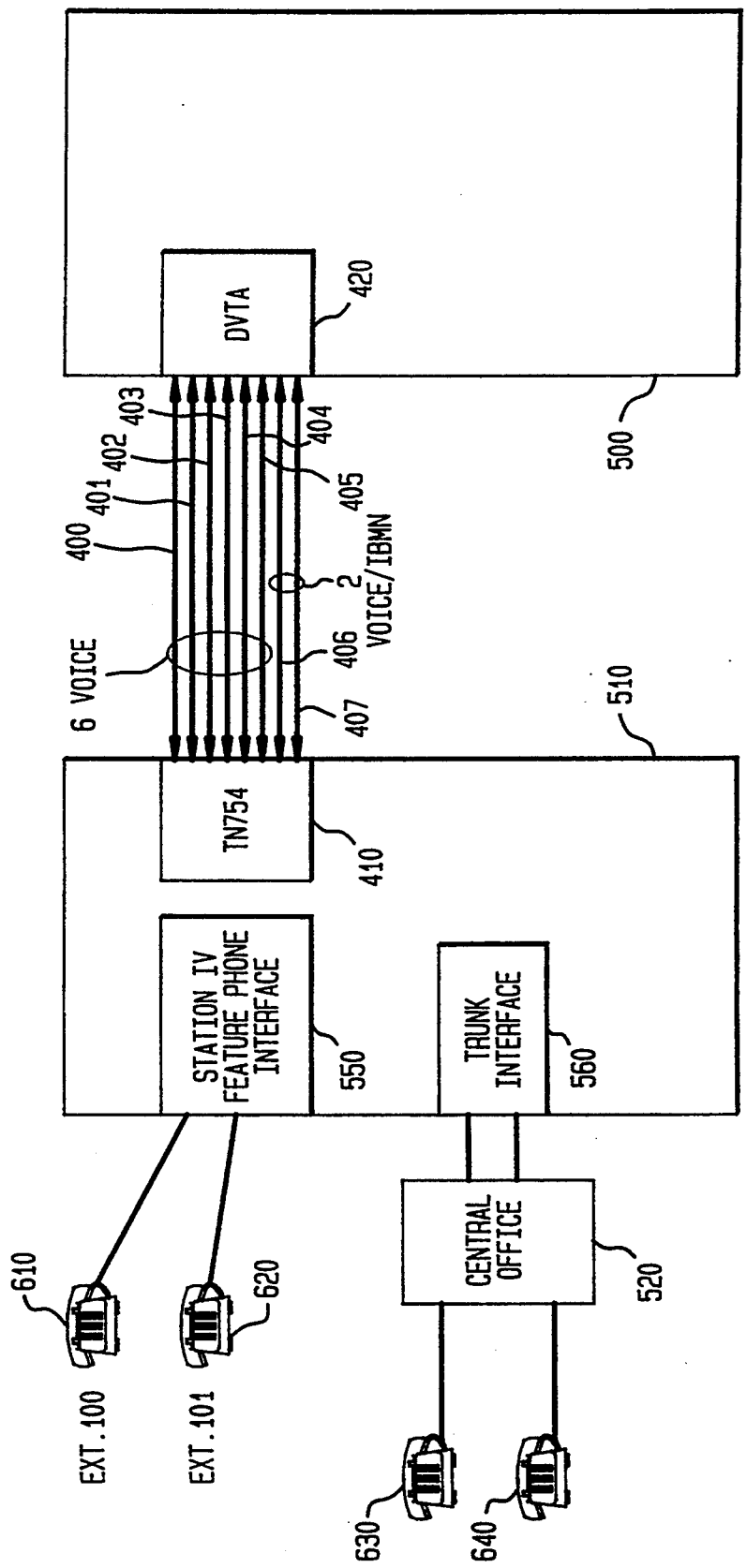

METHOD AND APPARATUS FOR INTERCONNECTING A MESSAGING SYSTEM AND A PRIVATE BRANCH EXCHANGE

TECHNICAL FIELD OF THE INVENTION

The present invention relates to method and apparatus for interconnecting a messaging system and a private branch exchange.

BACKGROUND OF THE INVENTION

Methods and apparatus exist in the art for interconnecting messaging systems such as, for example, a voice mail system, with a private branch exchange ("PBX"). For example, U.S. Pat. No. 4,873,718 discloses a method and apparatus for interconnecting a voice messaging system with a PBX which entails use of a multiple line feature telephone interface for retrieving call control information. The interconnection that is made in accordance with the disclosure is illustrated in FIG. 1. This disclosure has a disadvantage in that the interconnection requires an actual feature telephone and, in accordance with the disclosure, the voice messaging system utilizes a single line connection for voice transfer and the voice messaging system taps into the display of the feature telephone to retrieve control information which is routed to the voice messaging system. In addition, the use of a single line connection has a further disadvantage in that there is lack of redundancy and there is decreased bandwidth since control information transmitted from the PBX is limited by the hardware and associated bandwidth of a single feature phone. A still further disadvantage is that analog transmissions are required. This complicates line handling since analog balancing is required.

Further, U.S. Pat. No. 4,926,462 to Ladd, et. al. discloses a method and apparatus for interconnecting a voice messaging system 250 with a PBX 210 wherein the interface is divided into two (2) parts; a feature phone interface 212 and a station interface unit 213. The interconnection that is made in accordance with the disclosure is illustrated in FIG. 2. In the disclosed interconnection configuration, the voice messaging system 250 appears to the PBX both as an actual feature phone having a multiple line capacity at extension numbers 241 and as a set of analog, single line telephones at voice port lines 240. The particular type of data link utilized to couple the PBX with the feature phone interface necessarily varies with the type of manufacturer. In accordance with the disclosure, if extension A221 calls extension B222 and is forwarded due to, for example, a ring-no-answer condition to a voice messaging system, the voice messaging system will receive call information from the PBX through the feature phone interface 212. The voice messaging system will go off-hook on an appropriate voice port 252 and process the call. Alternatively, a voice port may be conferenced into the call and the feature phone interface will subsequently be disconnected. While the voice port processes the call, calls arriving on other extensions via station interface unit 214 or calls received from external phones 201 via a central office 203 and truck interface unit 208 may be answered by the feature phone emulator interface 251 and processed in a similar manner. The external calls are received over truck groups 205 and 206. This disclosure has a disadvantage in that control information for a given call is transmitted over a separate link 241 which must be dedicated to handling control information. Further, there is a lack of redundancy and decreased bandwidth since control information transmitted from the PBX is limited by the hardware and associated bandwidth of a single feature phone. A second disadvantage is that analog transmissions are required. This complicates line handling since analog balancing is required.

In light of the above, there is a need in the art for a method and apparatus for interconnecting a messaging system (voice, facsimile, and so forth) with a PBX which provides entirely digital voice transmission and which provides high bandwidth and redundant transmission of control information between the messaging system and the PBX.

SUMMARY OF THE INVENTION

Advantageously, embodiments of the present invention provide a method and apparatus for interconnecting a messaging system (voice, facsimile, and so forth) with a private branch exchange ("PBX") which provides entirely digital voice transmission and which provides high bandwidth and redundant transmission of control information between the messaging system and the PBX In particular, an embodiment of the present invention is a telephone system which comprises: (a) a telephone switching system comprising an interface to one or more digital links, the interface being for supplying control and voice information relating to a call over one of the one or more digital links and for receiving other control and voice information relating to the call or to another call over the one of the one or more digital links, the other control and voice information relating to another call comprising information relating to In-Band Message Notification (IBMN); (b) a messaging system for receiving at least a portion of the control information and at least a portion of the voice information relating to the call from the telephone system and for transmitting the other control and voice information to the telephone system; and (c) a messaging system interface between the one or more digital links and the messaging system, the messaging system interface being for receiving the control and voice information from the one of the one or more digital links and for supplying the at least a portion of the control information and at least a portion of the voice information from the call to the messaging system and for transmitting the other control and voice information received from the messaging system over the one of the one or more digital links.

BRIEF DESCRIPTION OF THE FIGURE

FIG. 3 shows a block diagram of an interconnection between a ROLM PhoneMail messaging system and an AT&T System 75 PBX in accordance with the present invention; and FIG. 4 shows a block diagram of the interconnection shown in FIG. 3 for purposes of illustrating the manner of its use.

DETAILED DESCRIPTION

Figure 1:
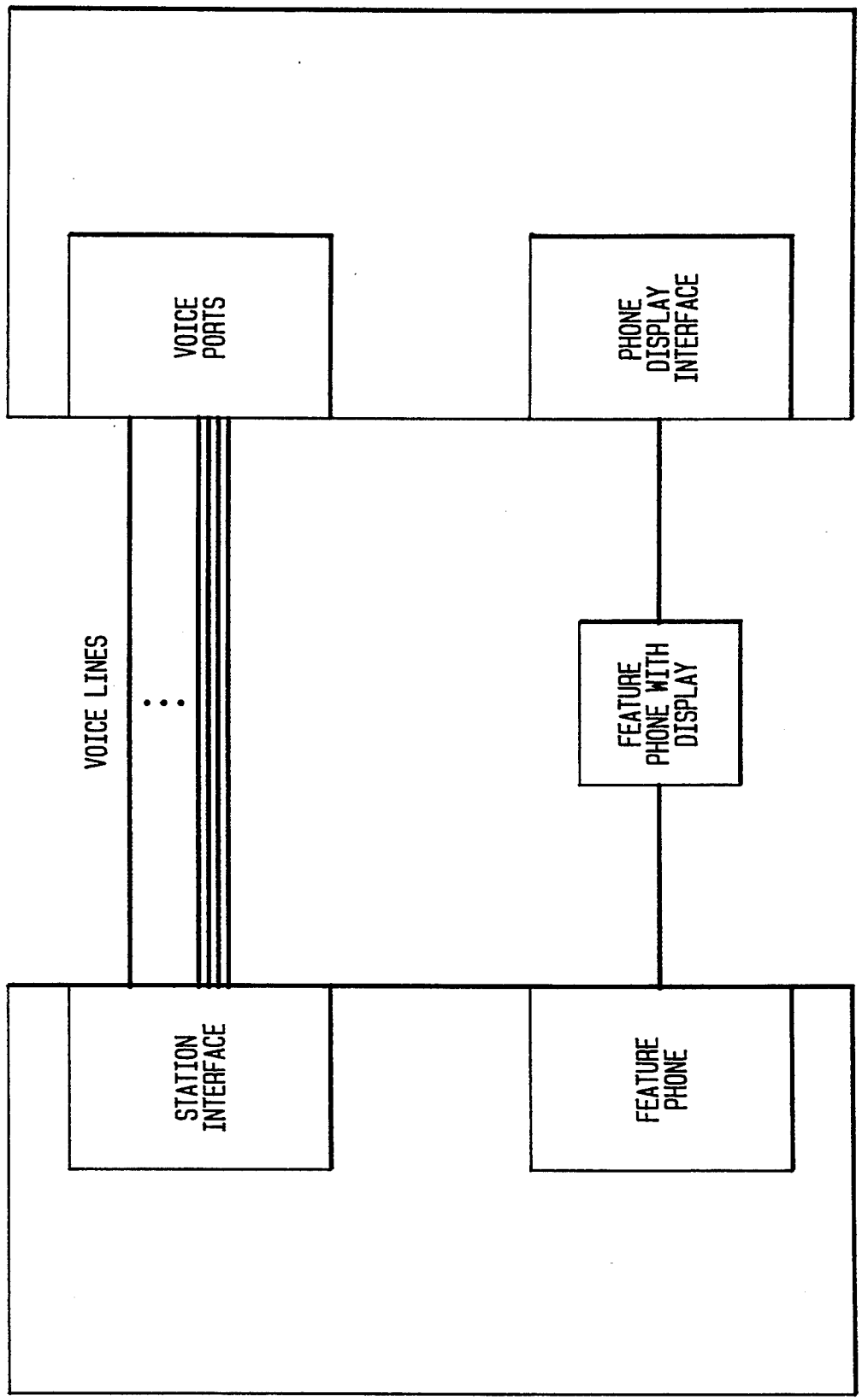
FIG. 1 shows a block diagram of a first method of interconnection between a voice mail system and a private branch exchange ("PBX")
Figure 2:
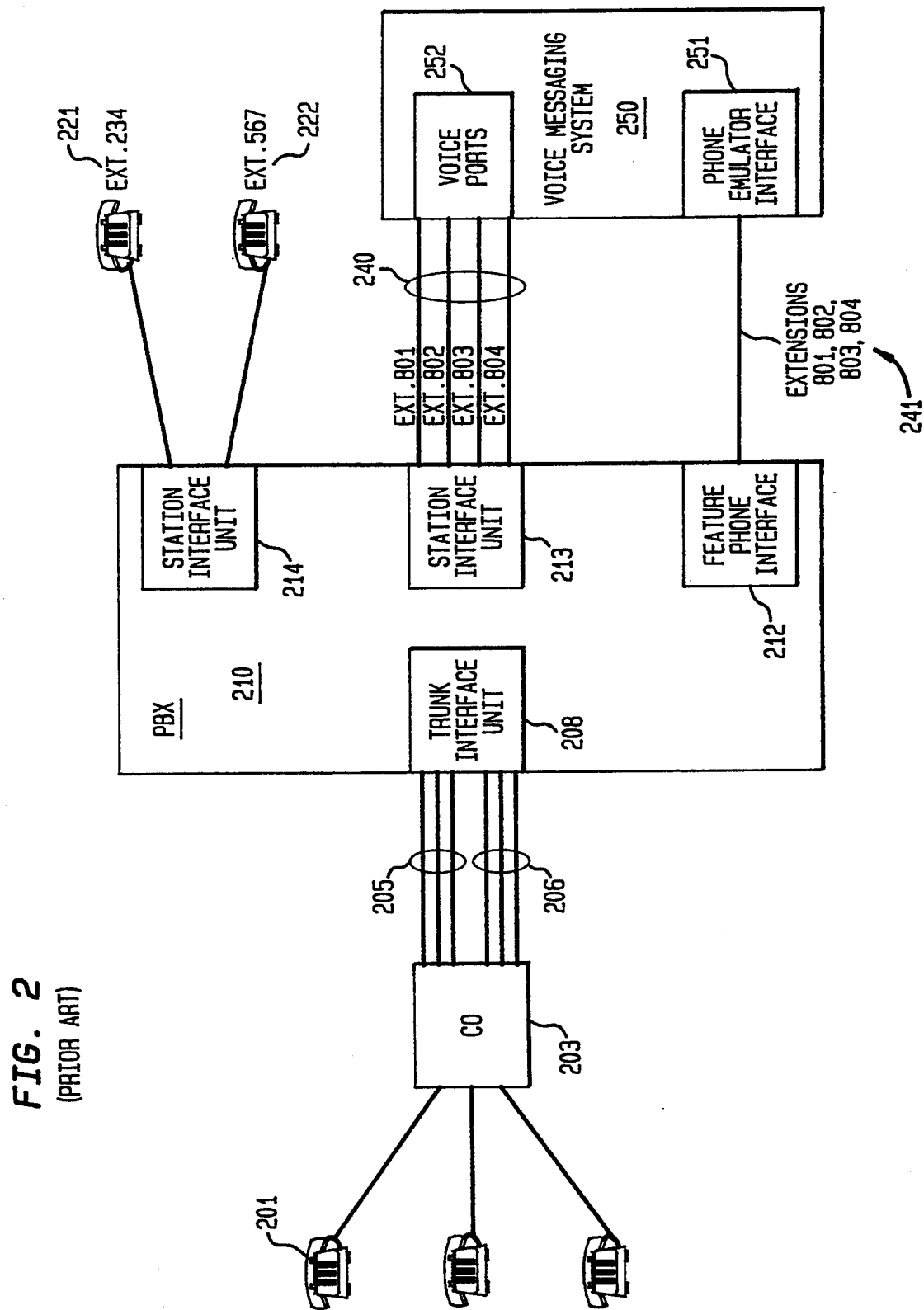
FIG. 2 shows a block diagram of a second method of interconnection between a voice mail system and a PBX.

Embodiments of the present invention are method and apparatus for interconnecting messaging systems (voice, facsimile, and so forth) with a private branch exchange ("PBX"). In particular, in accordance with the present invention, a digital voice terminal adapter ("DVTA") is a combination of hardware and software which emulates a digital feature phone and which interconnects a messaging system and a PBX to provide full integration of the messaging system with the PBX. A preferred embodiment of the present invention has been fabricated for interconnecting a PhoneMail messaging system produced by ROLM Company of Santa Clara, California with PBXs fabricated by AT&T such as the System 75, System 85, Definity Generic I, Definity Generic II, and Definity Generic III to provide a full, digital integration with these PBXs. However, those of ordinary skill in the art should understand that the present invention is not limited to interconnection with these PBXs.

In accordance with the preferred embodiment of the present invention, the DVTA emulates an AT&T 7406D digital telephone and provides communication between the PBX and the messaging system (the ROLM Company PhoneMail messaging system). In accordance with the preferred embodiment, one voice channel in the PhoneMail messaging system requires one digital link and appears to the PBX as one feature telephone. Further, in the PhoneMail messaging system, within each group of digital links, two or three digital links are allocated to provide the dual functions of In-Band Message Notification (IBMN) and voice transmission to subscribers. However, despite this allocation, in accordance with the present invention, all digital links and the interfaces thereto, regardless of whether they are used for voice or voice/IBMN, are identical. In particular, this means that any of the digital links could be allocated to provide the dual functions.

In accordance with the preferred embodiment, a single DVTA card contains interfaces to eight (8) digital links. In the preferred embodiment, the particular AT&T PBX digital line card which is required to be used in a particular application depends on the type of switch. For example, for the System 75 and Definity Generic I, the PhoneMail messaging system requires model TN754 PBX digital line cards in the PBX (for version eleven (11) or later, each TN754 PBX digital line card supports eight (8) digital links). For the System 85 and Definity Generic II, the PhoneMail messaging system requires model SN270B PBX digital line cards (for version three (3) or later, each SN270B PBX digital line card supports four (4) digital links).

Once physical line connections have been established, in accordance with the preferred embodiment of the present invention, the PBX must be properly configured. One digital station line is required for each PhoneMail messaging system channel. Thus, in accordance with the preferred embodiment, each PBX digital station line allocated for use by the PhoneMail messaging system is assigned to be a member of a Linear Call Distribution ("LCD") hunt group in the PBX. As is well known, calls which are forwarded to the pilot number of this LCD hunt group will hunt to the first member of the group and proceed to the next member if that line is active. This group can be configured to provide a busy signal to incoming calls whenever all lines in the group are busy or this group can queue callers who will then continue to hear ringing until a line becomes available.

In addition to the above, in accordance with the preferred embodiment, two special PhoneMail messaging system access numbers, Direct Access and Guest Access, are configured to have, as dialing targets, two phantom Uniform Call Distribution ("UCD") hunt groups. These hunt groups are software-only, UCD hunt groups with no group members which are configured so that each hunt group permanently forwards all of its calls to the LCD hunt group of digital station lines connected to the PhoneMail messaging system. Whenever subscribers dial these phantom groups, their calls are forwarded to the PhoneMail messaging system, together with information indicating that the subscriber is the calling party (by providing, for example, the subscriber telephone number) and that one of the phantom hunt groups is the called party (by providing, for example, the phantom hunt group number). The phantom hunt group number is used by the PhoneMail messaging software to recognize the need to play special prompts to the caller.

In order to support In-Band Message Notification with the AT&T PBXs, in the preferred embodiment, the PhoneMail messaging system utilizes an AT&T PBX feature known as "Leave Word Calling," a standard feature on most AT&T PBX releases. Digital station lines which are configured to support this feature can accommodate requests from the PhoneMail messaging system to activate or deactivate message waiting indicators for any PBX extension. Voice/IBMN lines are multi-purpose lines in the sense that they can be used to process incoming or outgoing calls or they can be used to transmit IBMN signals which are interpreted by the PBX as a request to activate or deactivate message waiting indicators. As is well known, when the PBX receives such a request it sends signals to a subscriber's station set to activate or deactivate a message waiting indicator. In accordance with the preferred embodiment, Voice/IBMN lines are configured in the PhoneMail messaging system as the last one or more digital lines associated with the LCD hunt group. This is done to minimize blockage. In case of high traffic, where all lines are used for incoming calls, the PhoneMail messaging system will buffer its IBMN calls until a line is free. Since the Voice/IBMN lines are configured on the last lines of the LCD hunt group, these will be the first lines to be free. However, it should be understood that, in accordance with the present invention, any of the digital links could be allocated to provide the IBMN function. This is useful in that if the PhoneMail messaging system detects a failure on one of the digital links assigned to the IBMN feature it can reconfigure itself to utilize other digital links to provide this function.

FIG. 3 shows a block diagram of an interconnection between ROLM PhoneMail messaging system 500 and AT&T System 75 PBX 510 in accordance with the present invention. As shown in FIG. 3, eight (8) digital links 400–407 are connected to single TN754 PBX line card 410. As further shown in FIG. 3, digital links 400–407 are connected, one-for-one, to eight (8) digital interfaces on single DVTA card 420. In the embodiment shown in FIG. 3, digital links 400–405 are configured as voice links and digital links 406–407 are configured as Voice/IBMN links. Note that there is no physical difference between digital links 400–405 and digital links 406–407 and the configuration merely refers to a software configuration in messaging system 500. Digital links 400–407 are grouped in an LCD hunt group whose pilot number corresponds to a "Forward" access to ROLM PhoneMail messaging system 500. Further, a first phantom UCD hunt group having no members has a pilot number which corresponds to a "Direct" access to ROLM PhoneMail messaging system 500 and a second phantom UCD hunt group having no members has a pilot number which corresponds to a "Guest" access to ROLM PhoneMail messaging system 500. It can be appreciated that utilizing an LCD hunt group for digital links 400–407 ensures that digital links 406 and 407 will be available most of the time for providing the IBMN function. Of course, the selection of particular digital links to provide the IBMN function is completely flexible and any one of digital links 400–407 may be so assigned or reassigned. A reassignment may occur, for example, due to failure detection by historical failure tracking or by any other well known method for detecting the need to provide reassignment.

FIG. 4 shows a block diagram of the interconnection shown in FIG. 3 for purposes of illustrating the manner of its use. As shown in FIG. 4, a calling party at extension 100 utilizes telephone 610 to place a call to a called party at extension 101 who uses telephone 620. In this example, the called party is already using his/her telephone and, as a result, the calling party is "busy-forwarded" to the pilot number of the LCD hunt group for messaging system 500. In a manner which will be described in detail below, messaging system 500, over one of digital links 400–407, receives identifications of the called and calling parties, as well as the forwarding condition (busy) of the call. Based on this information, messaging system 500 plays a personal greeting and stores calling party header information (as is well known, such header information includes the identification of the calling party, the time of the call, and so forth) so that it can later provide the called party with calling party header information. If the calling party is internal to PBX 510 (for example, as shown for extensions 100 and 101 in FIG. 4) and his/her own telephone extension number is included as part of an identification field, then messaging system 500 will assume this to be an internal caller. Otherwise, the calling party will be assumed to be external (calling parties at telephone 630 and 640 sitting behind central office 520 are external). As shown in FIG. 4, internal telephones 610 and 620 are interconnected with PBX 510 via station or feature phone interface 550 and external telephones 630 and 640 are interconnected with PBX 510 via trunk interface 560.

The following describes implementation details of DVTA 420 in a preferred embodiment of the present invention wherein PBX 510 is an AT&T PBX. An AT&T digital phone link, each of digital links 400–407, consists of four wires, one pair of wires (a standard twisted pair of building cable) for uplink transmission (from messaging system 500 to PBX 510) and one pair of wires (a standard twisted pair of building cable) for down link transmission (from PBX 510 to messaging system 500). Each pair carries Alternate Mark Inversion ("AMI"), Return-to-Zero, 50% duty cycle, 5V peak-to-peak signals. As is well known, AMI requires alternating "one" pulses to toggle between positive and negative polarity in order to eliminate DC bias on the signal. Digital information on the link is grouped into twenty (20) bit frames, eight-thousand (8000) of which are transmitted per second for a total bit rate of 160 Kbits/second. Each frame consists of two groups of ten (10) bits, one for "data" and the other for voice. In the preferred embodiment, only the ten (10) bit group relating to voice is of relevance to DVTA 420 (However, it should be understood that the present invention is not limited to embodiments which only use one channel of digital information transmitted between the messaging system and the PBX). These ten bits include one violation (framing) bit, one signaling or control bit, and eight voice bits. The down link front end of DVTA 420 comprises an ISDN S-Interface 1:1 transformer and analog protection circuitry followed by a buffer/driver and voltage comparators for converting AMI signals to unipolar. The TTL logic level, unipolar signals are then processed by digital circuitry which uses a phase locked loop ("PLL") to synchronize the messaging system clock with data edges, separates voice (8 voice bits) and control data (1 signaling or control bit), and assembles data to be sent back uplink to PBX 510. DVTA 420 receives the 1-bit control information normally passed from PBX 510 to a 7406D feature phone for the purpose of activating the phone's display and provides it to the control software of messaging system 500 for decoding and processing in a manner which is well known to those of ordinary skill in the art. The bits of control information are aggregated to provide an information channel which comprises details of a telephone call such as the identities of the calling and called parties, the nature of the forwarding condition (for example, busy, ring-no-answer, station forwarding, all calls forwarding, and so forth), the origin of the call (for example, internal or external), and signals intended to indicate a far-end disconnect. AT&T uses a proprietary, non-standard version of the well known HDLC LAPB X.25 protocol to accomplish the signaling or feature phone control function. This protocol was decoded to provide the information set forth above. This protocol can be conceptualized as a superposition of functional layers, each layer being responsible for accomplishing a different set of tasks. The tasks work together to transfer meaningful control information between two stations. A subset of the required layer two HDLC protocol supports both down- and uplink communication (bit stuffing, CRC check, and flag and address recognition) and is accomplished in a manner which should be well understood to those of ordinary skill in the art in hardware and loadware. The remaining portion of the layer two support and all of the layer three support is accomplished in a manner which should be well understood to those of ordinary skill in the art in software which runs on a microprocessor (not shown) on DVTA 420. However, those of ordinary skill in the art should appreciate that the present invention is not limited to the nature of the protocol for transferring control information between the PBX and the messaging system.

In addition to its role as an interface to PBX 510, DVTA 420 hardware handles two-way voice sample buffering, voice data manipulation, DTMF recognition, timed tone generation, call progress monitoring, and all functions associated with communicating information to and from the rest of Messaging system 500. This is done by a Z80 microprocessor and an ADSP-2101 microprocessor (not shown), together with assorted peripherals in a manner which is well known to those of ordinary skill in the art. For example, it is well understood in the art of telephony how to recognize DTMF tones, generate timed tone, how to provide call progress monitoring, and so forth.

In the preferred embodiment, DVTA 420 is utilized to build redundancy into the above-described clocking scheme. As was discussed above, DVTA 420 derives its clock from the PBX by synchronizing to the incoming data stream with a PLL (not shown). DVTA 420 further provides this clock to the messaging system. Firmware, for example, by default, configures link 400 as being a link from which to derive a master clock and link 401 as being a link from which to derive a backup clock. If the master clock fails in any way, DVTA 420 detects this failure and switches so that it will consider the backup clock derived from link 402 as being a new master clock and will assign a new link from which to derive the backup clock. In accordance with the present invention, this function of switching to a new master can continue to all links on a DVTA card and can also roll over to another DVTA card. As a result, in a preferred embodiment configured for 16 channels, there exists sixteen (16) different sources of clock redundancy.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention. Thus, it is to be understood that the claims appended hereto are intended to cover all such modification and variations which fall within the true scope and spirit of the invention.

What is claimed is:

1. A telephone/messaging system comprising:

a telephone switching system having first interface means connected to a first digital link for digitally transmitting and receiving both control information and voice information, including receiving control information related to In-Band Message Notification (IBMN);

messaging interface means connected to said first digital link for both digitally transmitting and receiving said control and voice information to and from said first interface means via said first digital link, including digitally transmitting said control information related to said IBMN; and messaging system means connected to said messaging interface means for selectively storing control and voice information received by said messaging interface means and for providing access to said stored control and voice information by said telephone switching system via said first interface means and said messaging interface means.

2. The telephone/messaging system of claim 1 wherein said messaging interface means is circuitry emulating a feature phone upon communication of said control and voice information with said first interface means.

3. The telephone/messaging system of claim 2 wherein said first interface means is a digital line card connected to said messaging interface means by a plurality of digital links that includes said first digital link, said plurality of digital links being configured as a hunt group.

4. The telephone/messaging system of claim 1 wherein said telephone switching system generates said control information, including control information related to at least one of the following: identification of a calling party, identification of a called party, transfer status of a call, and identification of whether said call is internal or external to said telephone switching system.

5. The telephone/messaging system of claim 1 wherein said first digital link is one of a hunt group of digital links connecting said first interface means to said messaging interface means, said messaging system means being connected to selectively receive a synchronizing clock signal from any one of a plurality of said digital links of said hunt groups, said synchronizing clock signal being generated by said telephone switching system.

6. The telephone/messaging system of claim 3 wherein said plurality of digital links are configured as a linear call distribution hunt group.

* * * * *